Figure 7:
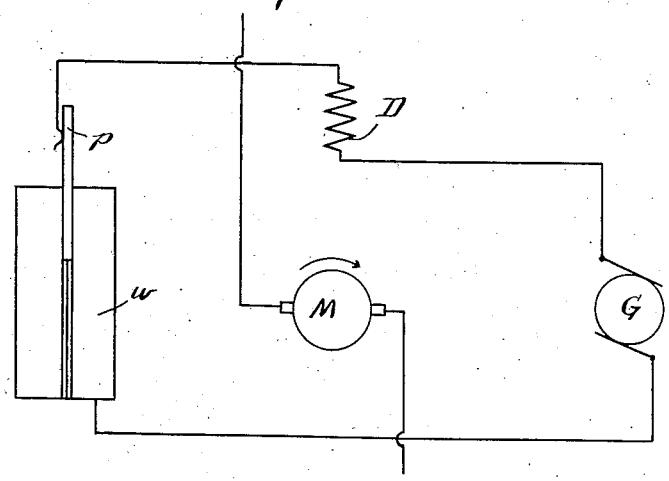

Feb. 3, 1925.
J. KJEKSTAD
1,524,714
METHOD OF AND APPARATUS FOR ELECTRIC ARC WELDING
Filed Nov. 2, 1918    2 Sheets-Sheet 1
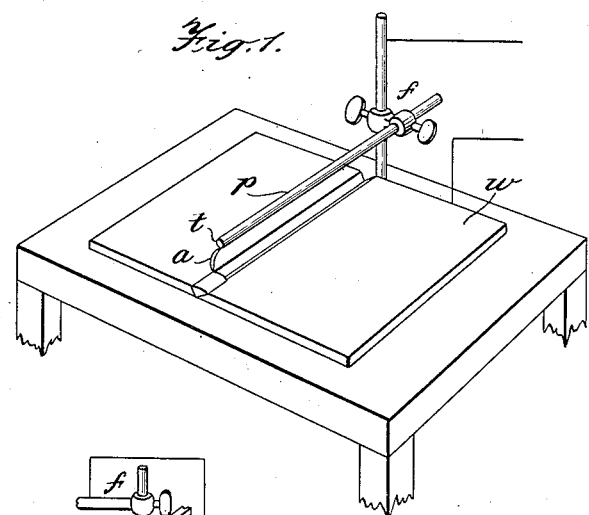
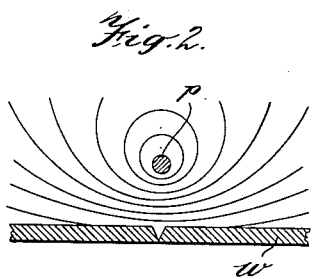
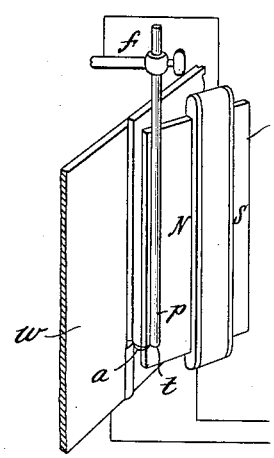
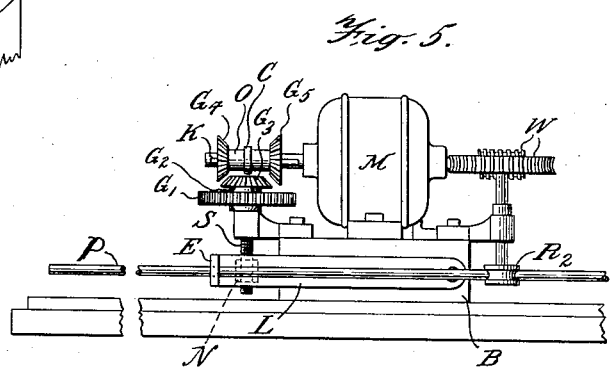
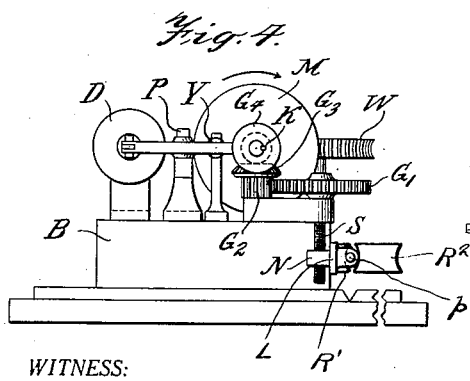
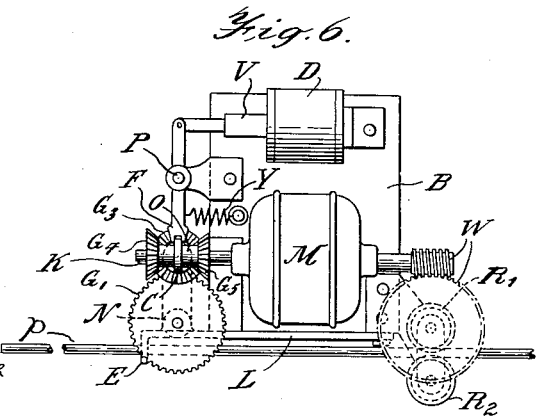
WITNESS:
INVENTOR.
Johannes Kjekstad
BY
Rosenbaum, Stockbridge & Borst
ATTORNEYS.

Patented Feb. 3, 1925.

1,524,714

UNITED STATES PATENT OFFICE.

JOHANNES KJEKSTAD, OF BROOKLYN, NEW YORK.

METHOD OF AND APPARATUS FOR ELECTRIC-ARC WELDING.

Application filed November 2, 1918. Serial No. 260,873.

*To all whom it may concern:*

Be it known that I, JOHANNES KJEKSTAD, a subject of the King of Norway, residing at the city of New York, in the borough of Brooklyn and State of New York, have invented certain new and useful Improvements in Methods of and Apparatus for Electric-Arc Welding, of which the following is a full, clear, and exact description.

Electric arc welding is done by means of the heat developed in the electric arc, and may be divided into two classes, viz., carbon arc welding, in which the metal needed for joining the several pieces is first placed on the seam and subsequently fused by means of an arc maintained between the work and a carbon electrode, and metallic arc welding, in which the arc is maintained between the work and a metallic electrode, the metal required for the weld being transferred from the electrode, or "pencil," through the arc and deposited upon the seam.

In either of the above classes of welding it is an essential requirement for obtaining a satisfactory weld that the characteristics of the arc be maintained with the least possible variation, the most important feature in this respect being apparently the temperature. Since with an approximately constant voltage, as ordinarily used in welding circuits, the temperature is mainly dependent on the length of the arc it becomes desirable that the distance between the pencil and the work be varied as little as possible.

In the devices hitherto used for electric welding the pencil is placed in a position nearly perpendicular to the surface of the work, being moved along the seam at a slow rate as the weld is being completed. As the pencil is consumed during this process it must be continuously fed toward the work in order to maintain the arc at a constant length. The proper feeding of the pencil toward the work has always been one of the main difficulties in electric welding because the wearing off of the electrode never occurs at a uniform rate but is subject to considerable variations. These may be due to lack of homogeneity in the material of the pencil, to unevenness in the surface of the work, to slight fluctuations in the voltage of the supply current, etc.

If the welding is done by hand, as is still mostly the case, the unsteadiness of the hand also affects the stability of the arc, resulting in frequent breaking of the latter. Re-establishing the arc after each break means loss of time as the pencil and weld rapidly cool off and have to be re-heated to the proper temperature before the work can proceed. It takes a long training for a man to manipulate the pencil satisfactorily, and experienced welders are, therefore, scarce and command high wages.

The difficulties above outlined are to a large extent overcome and a simple automatic welding apparatus obtained by means of the apparatus shown in the accompanying diagrams, which are adapted for carrying out my improved method.

Figure 6:
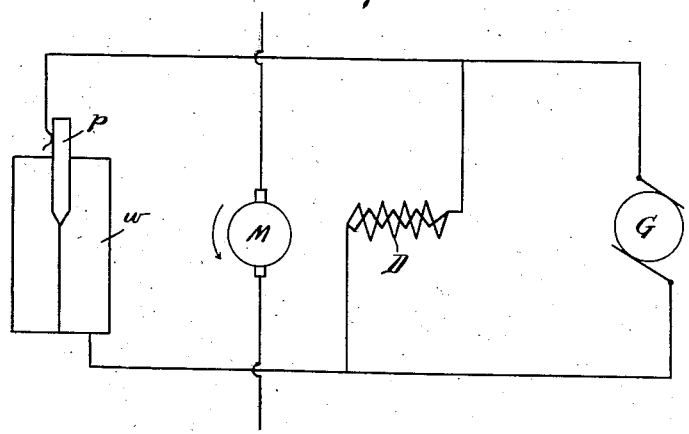

Fig. 1 represents a perspective view of the simplest form of apparatus; Fig. 2 is a diagram of a magnetic field present during the operation of the invention; Fig. 3 illustrates the use of a special magnet for positioning the arc; Figs. 4, 5 and 6 illustrate a type of apparatus in which the pencil may be fed longitudinally and adjusted towards or away from the work; and Figs. 7 and 8 are circuit diagrams showing the series and shunt connection of the solenoid controlling the motor operation.

The pencil $p$, in accordance with my invention, instead of being arranged in the customary way, i. e., perpendicular to the surface of the work, is placed parallel to the direction of the seams in the work $w$ to be welded, being adjustably supported at $f$, and the arc $a$ is formed between the free end $t$ of the pencil and the work.

As is well known, any conductor carrying an electric current is surrounded by a magnetic field, the magnetic lines of force forming rings or loops about the conductor, as shown in Fig. 2. An arc established between the pencil and the work will have to traverse such a magnetic field, thereby intersecting the lines of force at right angles. According to electric theory a current intersecting magnetic lines will give rise to a force acting at right angles to both the current and the lines of force, therefore, since the arc is in the present case a conductor carrying current, it will be subjected to a force acting parallel to the axis of the pencil.

Applying the simple rules for finding the direction of this force, we find that the arc will always be forced out toward the free end of the pencil. The magnitude of the force is proportional to the product of the field intensity and the amperage of the current, or, since the former is practically proportional to the latter, to the square of the amperage. As the amperage used in electric welding is usually high the effect will be very pronounced, the arc being kept steadily at the point of the pencil, the force acting upon it bending it out into a crescent-like shape, as shown in Fig. 1.

As the pencil is being consumed the arc gradually follows along the seam toward $f$, but this will not affect its length, the distance between the pencil and the work being the same along the entire length of the former, provided the plane of the seam does not change. The transient changes in the length of the arc which are caused by unevenness in the surface of the work are to a certain extent counteracted by the magnetic field which has thus also a regulatory effect upon the arc. If, for instance, the arc is momentarily shortened its electric resistance will drop and its amperage rise, resulting in an increase of the force acting upon it. The arc, behaving like an elastic thread, is thereby bent out still further and its length correspondingly increased. Very little attention is thereby required after the arc has once been struck.

The above described device is open to several improvements. Sometimes it may be desirable to increase further the force acting upon the arc, as in cases when the pencil is held in a vertical position with the arc burning at its lower end, as indicated in Fig. 3. The heated layers of air surrounding the arc will then tend to move the arc upward, against the action of said force, and the effect of the air current may easily prove the stronger of the two.

Such increase may be obtained by blowing a current of air against the arc so as to force it downward, or by the arrangement shown in Fig. 3, where a magnet $m$ is placed alongside the pencil in such a way that the field, produced between the latter and the work by the welding current, is reinforced. Assuming the pencil to be the negative electrode, the magnet may be placed with its north pole to the right of the pencil as indicated. The magnet is preferably energized by the welding current as in this case the regulatory effect of the field is further increased.

With a fixed pencil, as above provided, the rate of movement of the arc along the seam is equal to the rate at which the pencil is being consumed. The latter may be varied to some extent by varying the section of the pencil, but for practical reasons pertaining to the stability of the arc, the available dimensions are of a rather limited scope, inadequate for practical requirements. In carbon arc welding the consumption of the pencil will usually be too slow for the requirements of the arc, and the latter is apt to remain too long in one place, thus overheating and burning the metal, while in metallic arc welding obviously no more metal will be deposited in a given length of seam than that contained in the pencil directly above it, which will in most cases be insufficient.

An arrangement in which the pencil may be given a movement in the direction of its own axis thus suggests itself. By this simple expedient it will be possible, in carbon arc welding, to move the arc along the seam at any desired rate, and in metallic arc welding to increase the amount of metal deposited ad lib., without changing the pencil section. If, for instance, the pencil is fed outwardly, in a direction from $f$ to $t$, at a rate equal to that at which the pencil is being consumed, the arc is kept stationary at one point, permitting any amount of metal to be deposited at this point, while, if the pencil is given a movement toward $f$, the amount of metal deposited per unit length of seam will be less than that contained in a unit length of the pencil.

It is practically impossible, however, to feed the pencil longitudinally and at the same time maintain a constant distance between its free end and the work without some additional means being provided for adjusting such variations in this distance as are sure to occur. The seam to be welded is often curved in the direction of the pencil, as when cylindrical pieces are to be welded, and even in welding straight seams the pencil is liable to be more or less imperfectly aligned. By making said adjusting means automatically responsive to changes in the length of the arc this difficulty is easily overcome.

Figs. 4 to 6 show a type of apparatus in which the pencil may be fed longitudinally and adjusted as above described.

The motor M through the worm drive W slowly rotates the grooved roller $R_1$ opposite which is a similar, idle roller $R_2$. The pencil is of a section slightly larger than the opening left between the two rollers, so that on being inserted between them it will be firmly held. If roller $R_1$ is rotated in a clockwise direction, as viewed from above, the pencil will be moved in a direction from right to left (Fig. 6).

Additional guidance is provided for the pencil by running it through the eyelet E. The eyelet is carried at the end of a lever L the other end of which is pivotally connected to the side of the base B. By means of the left-hand threaded screw S engaging the nut N which is fastened to the lever the eyelet may be raised or lowered according to the way the screw is rotated. This movement will cause the distance between the point of the pencil and the work to vary accordingly.

The screw S is connected through the cylindrical gears $G_1$, $G_2$ to the conical gear $G_3$ (Fig. 5) which is mounted between the two conical gears G₄, G₅, the latter being cast in one piece with the bushing O. The bushing is mounted on the shaft of the motor M, a key and keyway K giving it freedom of motion longitudinally while forcing it to rotate with the motor shaft. A collar C on the bushing is gripped by the fork F which swings about a pivot P secured to the base. The position of the fork is controlled by the spring Y and the iron plunger V which is placed within the windings of the solenoid D.

The current of a sufficient strength traverses the solenoid the attraction between the latter and the plunger will overcome the tension of the spring, thereby moving the bushing O toward the left and cause G₅ to engage G₃. If the strength of the current is low the spring will get the upper hand and move the bushing to the right, making G₄ engage G₃. Between the two positions the bushing has a certain amount of idle motion during which neither of the gears G₄, G₅ will take hold. As long as the current through the solenoid is, therefore, kept within definite limits the eyelet will remain in the same position.

With the motor armature rotating in the direction indicated by an arrow in Fig. 4, the pencil being fed toward the arc, as will be the general case in metallic arc welding, the solenoid D is connected in series with the arc, as indicated in Fig. 7. If the arc is shortened its resistance will be reduced and the current through the solenoid increased, the bushing O being moved to the left. This causes the gears to turn the screw S in such a direction that the point of the pencil is moved away from the work, the movement being kept up until the arc has been restored to its original length. If the arc gets too long it will be similarly shortened as the bushing is thrown to the right.

In carbon arc welding the movement of the pencil will usually be from left to right, as already mentioned, which will correspond to a rotation of the motor armature in the opposite direction. Such reversal of rotation is easily accomplished by reversing the field of the motor. The solenoid D is in this case connected in shunt with the arc, as indicated in Fig. 8, its windings being split up into several parts which may be connected in parallel or in series so as to give it the proper resistance. If the arc is now lengthened its voltage is increased, and more current is thus sent through the magnet, the bushing being consequently thrown to the left. This will, in the latter case, cause the length of the arc to be decreased until normal conditions have been restored.

In the arrangement described the adjusting of the pencil relative to the work does not produce any reaction upon the controlling mechanism, which fact will permit the application of considerable force to the pencil. The latter may thus be automatically unwound from a coil and straightened out during the welding process, doing away with the replacing of pencils at short intervals, as is required when straight, cut-up rods are used.

Many other arrangements and improvements are possible in a device of this character. The feeding of the pencil may thus be combined with an oscillatory movement of the point, transversely to the feed and parallel to the surface of the work, for the purpose of obtaining a wide weld. If separate lengths of rods are used for the pencil, heavier dimensions may be used by providing means for rotating the pencil so as to insure a more uniform consumption through the arc. Magnets may be used for securing the device to the work so as to facilitate its being used for vertical or overhead work. These magnets may be made in the shape of rollers which are rotated by the motor; through the latter arrangement the device may be given a movement in the direction of the seam to be welded, which may be of advantage when the seam is of considerable length as it would obviate the necessity of frequently changing the position of the device during the progress of the work.

Other devices have already been invented in which the pencil is automatically fed and the arc automatically moved along the seam. But in all of these devices the pencil is arranged substantially perpendicular to the surface of the work, giving rise to all the irregularities in the condition of the arc referred to above. An important feature of the present invention is the fact that the pencil or other electrode is arranged or maintained in a position generally parallel to the seam to be welded, permitting the arc to be maintained with the least possible variation, and thus insuring a uniform character of the weld. While the invention appears to have its greatest utility in connection with work in which true parallelism can be maintained, as with a flat plate, it is manifestly applicable in a broad sense to work of curved or other shape departing more or less from a plane, so long as the arc is at an angle to the axis of the pencil or other electrode, and the amount of metal deposited or heat generated in a unit of length of seam is controlled by the longitudinal moving of the electrode.

I claim:

1. In electric arc welding, the method which consists in maintaining the electrode in such relation to the work that the arc is at an angle to the axis of the electrode, and moving the arc end of the electrode toward and from the work to compensate for variations in the plane of the weld and maintain the length of the arc substantially constant.

2. In electric arc welding, the method which consists in maintaining the electrode in such relation to the work that the arc is at an angle to the axis of the electrode, moving the arc end of the electrode toward and from the work to compensate for variations in the plane of the weld and maintain the length of the arc substantially constant, and progressively moving the electrode longitudinally to control the period of application of the arc to a unit length of seam.

3. In electric arc welding, the method which consists in maintaining the electrode in such relation to the work that the arc is at an angle to the axis of the electrode, and establishing an auxiliary magnetic field about the electrode, reinforcing the field of the welding current.

4. In electric arc welding, the method which consists in maintaining the electrode substantially parallel to the seam to be welded during the passage of the arc, and establishing an auxiliary magnetic field about the electrode reinforcing the field of the welding current.

5. In electric arc welding, the method which consists in maintaining the electrode substantially parallel to the seam to be welded during the passage of the arc, and progressively moving the electrode longitudinally to control the period of application of the arc to a unit length of seam.

6. In electric arc welding, the method which consists in maintaining the electrode substantially parallel to the seam to be welded during the passage of the arc, progressively moving the electrode longitudinally to control the period of application of the arc to a unit length of seam, and moving the arc end of the electrode toward and from the work to compensate for variations in the plane of the weld and maintain the length of the arc substantially constant.

7. An electric arc welding apparatus comprising a work holder, an electrode holder arranged to hold the electrode opposing the work at substantially a right angle to the arc, and means for progressively moving the electrode longitudinally.

8. An electric arc welding apparatus comprising a work holder, an electrode holder arranged to hold the electrode opposing the work at substantially a right angle to the arc, and electro-responsive means controlled by the resistance at the arc for moving the arc end of the electrode toward and from the work to compensate for variations in the plane of the weld and maintain the length of the arc substantially constant.

9. An electric arc welding apparatus comprising a work holder, an electrode holder arranged to hold the electrode opposing the work at substantially a right angle to the arc and including an adjustable support for the arc end of the electrode, and electro-responsive means controlled by the resistance at the arc operatively connected to the adjustable support and adapted to move the same to compensate for variations in the plane of the weld and maintain the length of the arc substantially constant.

10. An electric arc welding apparatus comprising a work holder, an electrode holder arranged to hold the electrode opposing the work at substantially a right angle to the arc and including a feeding mechanism and an adjustable support for the arc end of the electrode, means for operating the feeding mechanism to move the electrode longitudinally, and electro-responsive means controlled by the resistance at the arc operatively connected to the adjustable support and adapted to move the same to compensate for variations in the plane of the weld and maintain the length of the arc substantially constant.

11. An electric arc welding apparatus comprising a work holder, an electrode holder arranged to hold the electrode opposing the work at substantially a right angle to the arc and including a feeding mechanism and an adjustable support for the arc end of the electrode, a motor-driven shaft operatively connected to the feeding mechanism to move the electrode longitudinally, actuating means for the adjustable support operative upon actuation to move the end of the electrode toward and away from the work, two operating members operated by the shaft, and adapted to operate the actuating means in respectively opposite directions and electro-responsive means controlled by the resistance at the arc for alternately clutching the actuating means with the operating members to maintain substantially a uniform arc.

12. An electric arc welding apparatus comprising a work holder, an adjustable electrode support arranged to hold the electrode opposing the work and operative when adjusted to vary the length of the arc, a motor-driven shaft, actuating means for the adjustable support, two operating members operated by the shaft and adapted when clutched to the actuating means to adjust the support in respectively opposite directions, shiftable means adapted to alternately clutch the operating members to the actuating means, and an electromagnet controlled by the resistance at the arc and arranged in control of the shiftable means.

In witness whereof, I subscribe my signature.

JOHANNES KJEKSTAD.